(12) United States Patent
Cha

(10) Patent No.: US 11,750,783 B2
(45) Date of Patent: Sep. 5, 2023

(54) DEMOSAIC OPERATION CIRCUIT, IMAGE SENSING DEVICE AND OPERATION METHOD OF THE SAME

(71) Applicant: SK hynix Inc., Gyeonggi-do (KR)

(72) Inventor: Su Ram Cha, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 168 days.

(21) Appl. No.: 17/147,966

(22) Filed: Jan. 13, 2021

(65) Prior Publication Data
US 2022/0021857 A1 Jan. 20, 2022

(30) Foreign Application Priority Data
Jul. 17, 2020 (KR) ........................ 10-2020-0088976

(51) Int. Cl.
*H04N 9/73* (2023.01)
*H04N 9/04* (2006.01)
*G06T 3/40* (2006.01)

(52) U.S. Cl.
CPC ............. *H04N 9/73* (2013.01); *G06T 3/4015* (2013.01); *G06T 3/4038* (2013.01);
(Continued)

(58) Field of Classification Search
CPC .. H04N 9/73; H04N 9/04515; H04N 9/04555; H04N 9/735; H04N 5/357;
(Continued)

(56) References Cited

U.S. PATENT DOCUMENTS

| 5,323,233 A | 6/1994 | Yamagami et al. |
| 7,106,912 B2 * | 9/2006 | Kokubo ............... H04N 5/3675 348/E5.081 |

(Continued)

FOREIGN PATENT DOCUMENTS

| CN | 101399996 A | 4/2009 |
| CN | 102640499 A | 8/2012 |

(Continued)

OTHER PUBLICATIONS

Krishnan Nallaperumal et al., A Novel Adaptive Weighted Color Interpolation Algorithm for Single Sensor Digital Camera Images, International Conference on Computation Intelligence and Multimedia Applications, 2007, pp. 477-481.

(Continued)

*Primary Examiner* — Abdelaaziz Tissire
(74) *Attorney, Agent, or Firm* — IP & T GROUP LLP

(57) ABSTRACT

A demosaic operation circuit includes a white pixel value estimation circuit suitable for acquiring an RGB channel average value and a directional gradient value of a white pixel for each direction using source pixel data provided from a pixel array, and estimating a white pixel value based on the RGB channel average value and the directional gradient value of the white pixel; a fine adjustment circuit suitable for finely adjusting an estimated white pixel value by removing noise through a different filter based on weight values which are differently allocated according to a gradient of a center pixel and a neighboring white pixel; a chroma estimation circuit suitable for estimating a chroma by calculating a chroma array based on the source pixel data and an adjusted white pixel value; and a color correction circuit suitable for correcting a color based on a finely adjusted white pixel value and the chroma.

20 Claims, 10 Drawing Sheets

(52) U.S. Cl.
CPC ..... *H04N 9/04515* (2018.08); *H04N 9/04555* (2018.08); *H04N 9/735* (2013.01)

(58) Field of Classification Search
CPC .. H04N 9/04517; H04N 9/64; H04N 9/04559; H04N 9/646; G06T 3/4015; G06T 3/4038; H01L 27/14609
See application file for complete search history.

(56) References Cited

U.S. PATENT DOCUMENTS

| | | | |
|---|---|---|---|
| 7,333,678 | B1 | 2/2008 | Huang et al. |
| 10,368,041 | B2* | 7/2019 | Iwakura ................. H04N 5/374 |
| 2005/0146629 | A1 | 7/2005 | Muresan |
| 2005/0190385 | A1* | 9/2005 | Chang ................ H04N 1/40087 358/1.9 |
| 2008/0152222 | A1 | 6/2008 | Takeuchi |
| 2008/0253652 | A1 | 10/2008 | Gupta et al. |
| 2009/0040336 | A1 | 2/2009 | Irie |
| 2009/0066821 | A1* | 3/2009 | Achong ............. H04N 9/04515 348/E5.091 |
| 2011/0050918 | A1* | 3/2011 | Tachi ................. H04N 5/23248 348/208.4 |
| 2013/0051665 | A1* | 2/2013 | Shinozaki ............... G06T 5/005 382/167 |
| 2013/0242148 | A1* | 9/2013 | Mlinar ............... H04N 9/04557 348/279 |
| 2014/0226905 | A1 | 8/2014 | Yahata et al. |
| 2014/0307122 | A1 | 10/2014 | Hayashi et al. |
| 2014/0313375 | A1* | 10/2014 | Mlinar ............. H01L 27/14685 348/241 |
| 2014/0347528 | A1 | 11/2014 | Tachi |
| 2017/0257605 | A1 | 9/2017 | Iwakura et al. |
| 2017/0374299 | A1 | 12/2017 | Liu et al. |
| 2018/0077397 | A1 | 3/2018 | Eto |
| 2019/0318452 | A1 | 10/2019 | Oh et al. |

FOREIGN PATENT DOCUMENTS

| | | |
|---|---|---|
| CN | 102663719 A | 8/2012 |
| CN | 103841388 A | 6/2014 |
| CN | 105430357 A | 3/2016 |
| CN | 105993169 A | 10/2016 |
| CN | 108171668 A | 6/2018 |
| CN | 108288254 A | 7/2018 |
| JP | 2010021908 A | 1/2010 |
| JP | 2009290795 A | 12/2019 |
| KR | 10-2017-0067123 | 6/2017 |
| KR | 1020190036253 A | 4/2019 |

OTHER PUBLICATIONS

Notice of Allowance for the Chinese Application No. 20211200736.3 issued by the Chinese Patent Office dated Jun. 6, 2023.

Wang Guo-Gang et al., Nonlocal-Similarity Algorithm for Color Image Demosaicing, Journal of Signal Processing, Apr. 2013, pp. 449-456, vol. 29, No. 4.

Dong, Pengyu, Demosaiching for 2×2 Non-Bayer Colour Filter Array, Apr. 15, 2018, pp. 59-62, vol. 35(04).

* cited by examiner

DEMOSAIC OPERATION CIRCUIT, IMAGE SENSING DEVICE AND OPERATION METHOD OF THE SAME

CROSS-REFERENCE TO RELATED APPLICATION

This patent application claims priority under 35 U.S.C. § 119 to Korean Patent Application No. 10-2020-0088976, filed on Jul. 17, 2020, which is herein incorporated by reference in its entirety.

TECHNICAL FIELD

Various embodiments of the present invention generally relate to a semiconductor device. Particularly, various embodiments relate to a demosaic operation circuit, an image sensing device and an operation method of the same.

BACKGROUND

Recently, the computer environment paradigm has shifted to ubiquitous computing, which enables a computer system to be used virtually anytime and everywhere. As a result, use of portable electronic devices such as mobile phones, digital cameras, notebook computers and the like has been rapidly increasing.

Recently, due to the rapid development of display devices, the development of image photographing devices having image sensors, such as cameras and camcorders, has accelerated. An image photographing device can photograph an image and record the photographed image in a recording medium, and reproduce the image at any time. Accordingly, since the use of image photographing devices has increased, the demand for more functionality in the image photographing device has also increased. Specifically, in addition to compact size, reduced weight, and lower power consumption, an image photographing device with higher capability functionality as well as multi-functions is desirable.

SUMMARY

Embodiments of the present disclosure are directed to a demosaic operation circuit, an image sensing device and an operation method of the same, capable of performing a demosaic operation for an image pattern having white pixel data of 50% among source pixel data having RGBW pattern.

In an embodiment, a demosaic operation circuit includes a white pixel value estimation circuit suitable for acquiring an RGB channel average value and a directional gradient value of a white pixel for each direction using source pixel data provided from a pixel array having a plurality of pixels, and estimating a white pixel value based on the RGB channel average value and the directional gradient value of the white pixel for each direction; a fine adjustment circuit suitable for finely adjusting an estimated white pixel value by removing a noise through a different filter based on weight values which are differently allocated according to a gradient of a center pixel and a neighboring white pixel; a chroma estimation circuit suitable for estimating a chroma for each channel by calculating a chroma array based on the source pixel data and an adjusted white pixel value; and a color correction circuit suitable for correcting a color based on a finely adjusted white pixel value and the chroma for each channel.

The white pixel value estimation circuit may include a white pixel value calculation circuit suitable for calculating the directional gradient value of the white pixel based on an absolute value of a pixel value difference between the white pixels and a pixel value difference between pixels having different colors among the source pixel data provided from the pixel array; an RGB channel average value calculation circuit suitable for calculating an RGB channel average value based on a location of a center pixel among the source pixel data provided from the pixel array; and a white pixel value estimator suitable for estimating the white pixel value based on the RGB channel average value and the directional gradient value of the white pixel for each direction.

The white pixel value estimation circuit may estimate the white pixel value corresponding to the center pixel using a horizontal direction filter and a vertical direction filter when the center pixel is a green pixel, a red pixel or a blue pixel.

Fine adjustment circuit may finely adjust the white pixel value based on a gradient value of the estimated white pixel value when the center pixel is the green pixel, the red pixel or the blue pixel.

The chroma estimation circuit may calculate the chroma array by subtracting a finely adjusted white pixel value from the source pixel data.

The chroma estimation circuit may allocate the chroma weight according to a chroma similarity for each channel to a chroma value of the center pixel among the chroma array, and estimates the chroma for each channel based on an allocated chroma weight.

The chroma estimation circuit may estimate the channel chroma for each channel according to the following equation:

$$R_c^{chroma} = \sum_{(i,j) \in kernel, R\ location} R^{chroma}(i,j) \times R_{wgt}^{chroma}(i,j)$$

$$G_c^{chroma} = \sum_{(i,j) \in kernel, G\ location} G^{chroma}(i,j) \times G_{wgt}^{chroma}(i,j)$$

$$B_c^{chroma} = \sum_{(i,j) \in kernel, B\ location} B^{chroma}(i,j) \times B_{wgt}^{chroma}(i,j)$$

where $R_c^{chroma}$ represents an estimated chroma of the red pixel located in the center, $G_c^{chroma}$ represents an estimated chroma of the green pixel located in the center, $B_c^{chroma}$ represents an estimated chroma of the blue pixel located in the center, wgt represents a weight, (i,j) represents a location of the red pixel, the green pixel and the blue pixel.

The color correction circuit may correct the color according to the following equation:

$$fcs_{gain} = DY_{gain} \times Edge_{gain} \times Color_{gain}$$

$$R_{est} = G_{out} + fcs_{gain} \times (R_{out} - G_{out})$$

$$B_{est} = B_{out} + fcs_{gain} \times (B_{out} - G_{out})$$

$$R_{out} = W_c^{est} + R_c^{chroma}$$

$$G_{out} = W_c^{est} + G_c^{chroma}$$

$$B_{out} = W_c^{est} + B_c^{chroma}$$

where $fcs_{gain}$ represents an error color correction gain, $Dy_{gain}$ represents a white pixel gain, $Edge_{gain}$ represents an edge gain, $Color_{gain}$ represents a color gain, $R_{out}$ represents a sum of the estimated chroma value and the finely adjusted white pixel value of the red pixel located in the center pixel, $G_{out}$ represents a sum of the estimated chroma value and the finely adjusted white pixel value of the green pixel located in the center pixel, $B_{out}$ represents a sum of the estimated chroma value and the finely adjusted white pixel value of the blue pixel located in the center pixel, $R_{est}$ represents a corrected color of the red pixel, $G_{est}$ represents a corrected color of the green pixel, and $B_{est}$ represents a corrected color of the blue pixel.

In another embodiment, an image sensing device may include an image sensor including a pixel array having a plurality of pixels; an image signal processor suitable for processing an output signal of the image sensor; and a mosaic operation circuit, wherein the mosaic operation circuit comprises a white pixel value estimation circuit suitable for acquiring an RGB channel average value and a directional gradient value of a white pixel for each direction using source pixel data provided from a pixel array having a plurality of pixels, and estimating a white pixel value based on the RGB channel average value and the directional gradient value of the white pixel for each direction; a fine adjustment circuit suitable for finely adjusting an estimated white pixel value by removing a noise through a different filter based on weight values which are differently allocated according to a gradient of a center pixel and a neighboring white pixel; a chroma estimation circuit suitable for estimating a chroma for each channel by calculating a chroma array based on the source pixel data and an adjusted white pixel value; and a color correction circuit suitable for correcting a color based on a fine adjusted white pixel value and the chroma for each channel.

The white pixel value estimation circuit may include a white pixel value calculation circuit suitable for calculating the directional gradient value of the white pixel based on an absolute value of a pixel value difference between the white pixels and a pixel value difference between pixels having different colors among the source pixel data provided from the pixel array; an RGB channel average value calculation circuit suitable for calculating an RGB channel average value based on a location of a center pixel among the source pixel data provided from the pixel array; and a white pixel value estimator ion circuit suitable for estimating the white pixel value based on the RGB channel average value and the directional gradient value of the white pixel for each direction.

The white pixel value estimator estimates the white pixel value corresponding to the center pixel using a horizontal direction filter and a vertical direction filter when the center pixel is a green pixel, a red pixel or a blue pixel.

The fine adjustment circuit may finely adjust the white pixel value based on a gradient value of the estimated white pixel when the center pixel is the green pixel, the red pixel or the blue pixel.

The chroma estimation circuit may calculate the chroma array by subtracting a finely adjusted white pixel value from the source pixel data.

The chroma estimation circuit may allocate the chroma weight according to a chroma similarity for each channel to a chroma value of the center pixel among the chroma array, and estimates the chroma for each channel based on an allocated chroma weight.

In another embodiment, an operation method of an image sensing device may include acquiring an RGB channel average value and a directional gradient value of a white pixel for each direction using source pixel data provided from a pixel array having a plurality of pixels, and estimating a white pixel value based on the RGB channel average value and the directional gradient value of the white pixel for each direction; finely adjusting an estimated white pixel value by removing a noise through a different filter based on weight values which are differently allocated according to a gradient of a center pixel and a neighboring white pixel; estimating a chroma for each channel by calculating a chroma array based on the source pixel data and an adjusted white pixel value; and correcting a color based on a fine adjusted white pixel value and the chroma for each channel.

The estimating of the white pixel value may include calculating the directional gradient value of the white pixel based on an absolute value of a pixel value difference between the white pixels and a pixel value difference between pixels having different colors among the source pixel data provided from the pixel array; calculating an RGB channel average value based on a location of a center pixel among the source pixel data provided from the pixel array; and estimating the white pixel value based on the RGB channel average value and the directional gradient value of the white pixel for each direction.

The estimating of the white pixel value may estimate the white pixel value corresponding to the center pixel using a horizontal direction filter and a vertical direction filter when the center pixel is a green pixel, a red pixel or a blue pixel.

The finely adjusting of an estimated white pixel value may adjust finely the white pixel value based on a gradient value of the estimated white pixel when the center pixel is the green pixel, the red pixel or the blue pixel.

The estimating of a chroma for each channel may calculate the chroma array by subtracting a finely adjusted white pixel value from the source pixel data.

The estimating of a chroma for each channel may allocate the chroma weight according to a chroma similarity for each channel to a chroma value of the center pixel among the chroma array, and estimates the chroma for each channel based on an allocated chroma weight.

In another embodiment, a non-transitory computer-readable storage medium storing executable instructions that, when executed by an image sensing device, cause the image sensing device to: acquire an RGB channel average value and a directional gradient value of a white pixel for each direction using source pixel data provided from a pixel array having a plurality of pixels, and estimating a white pixel value based on the RGB channel average value and the directional gradient value of the white pixel for each direction; finely adjust an estimated white pixel value by removing a noise through a different filter based on weight values which are differently allocated according to a gradient of a center pixel and a neighboring white pixel; estimate a chroma for each channel by calculating a chroma array based on the source pixel data and an adjusted white pixel value; and correct a color based on a finely adjusted white pixel value and the chroma for each channel.

These and other features and advantages of the present invention will become understood by those with ordinary skill in the art of the present invention from the following drawings and detailed description.

BRIEF DESCRIPTION OF THE DRAWINGS

The description herein makes reference to the accompanying drawings wherein like reference numerals refer to like parts throughout the several views.

DETAILED DESCRIPTION

Figure 1:
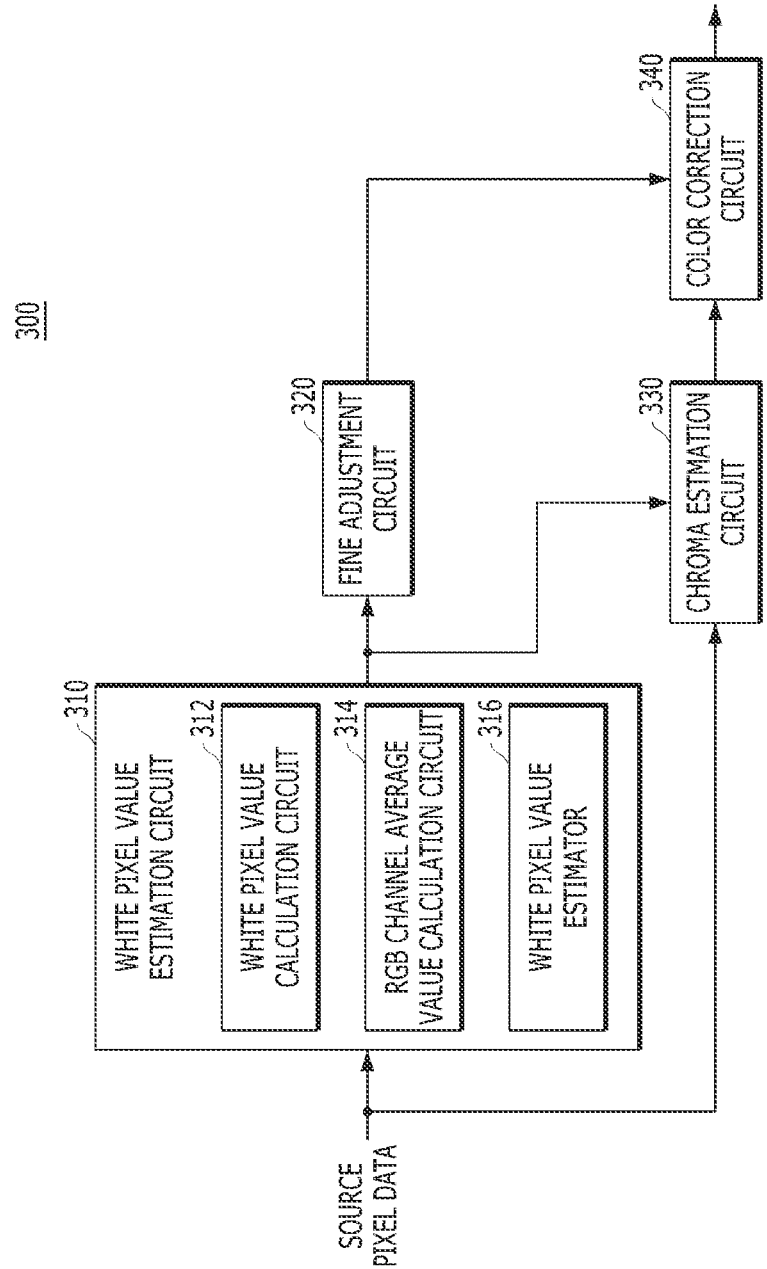
FIG. 1 is a block diagram illustrating a demosaic operation circuit in accordance with an embodiment of the present disclosure.

Various examples of the present invention are described below in more detail with reference to the accompanying drawings. The invention may be realized in other embodiments, forms and variations thereof and should not be construed as being limited to the embodiments set forth herein. Rather, the described embodiments are provided so that this present disclosure is thorough and complete and fully conveys the present invention to those skilled in the art to which this invention pertains. Throughout the specification, reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance may be referred to as a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected/coupled, may be wired or wireless, unless the context indicates otherwise. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise. The articles 'a' and 'an' as used in this application and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the present invention and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the present disclosure are described in detail with reference to the accompanied drawings.

Hereinafter, a demosaic operation circuit is described with reference to FIGS. 1 to 7.

Figure 2:
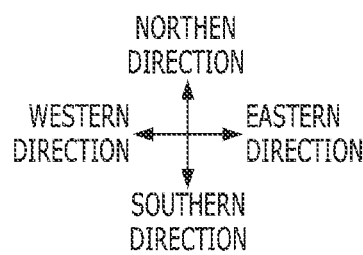
FIG. 2 is a diagram illustrating a calculation of white pixel value for each direction based on a pixel value difference between pixels having different colors.
Figure 3:
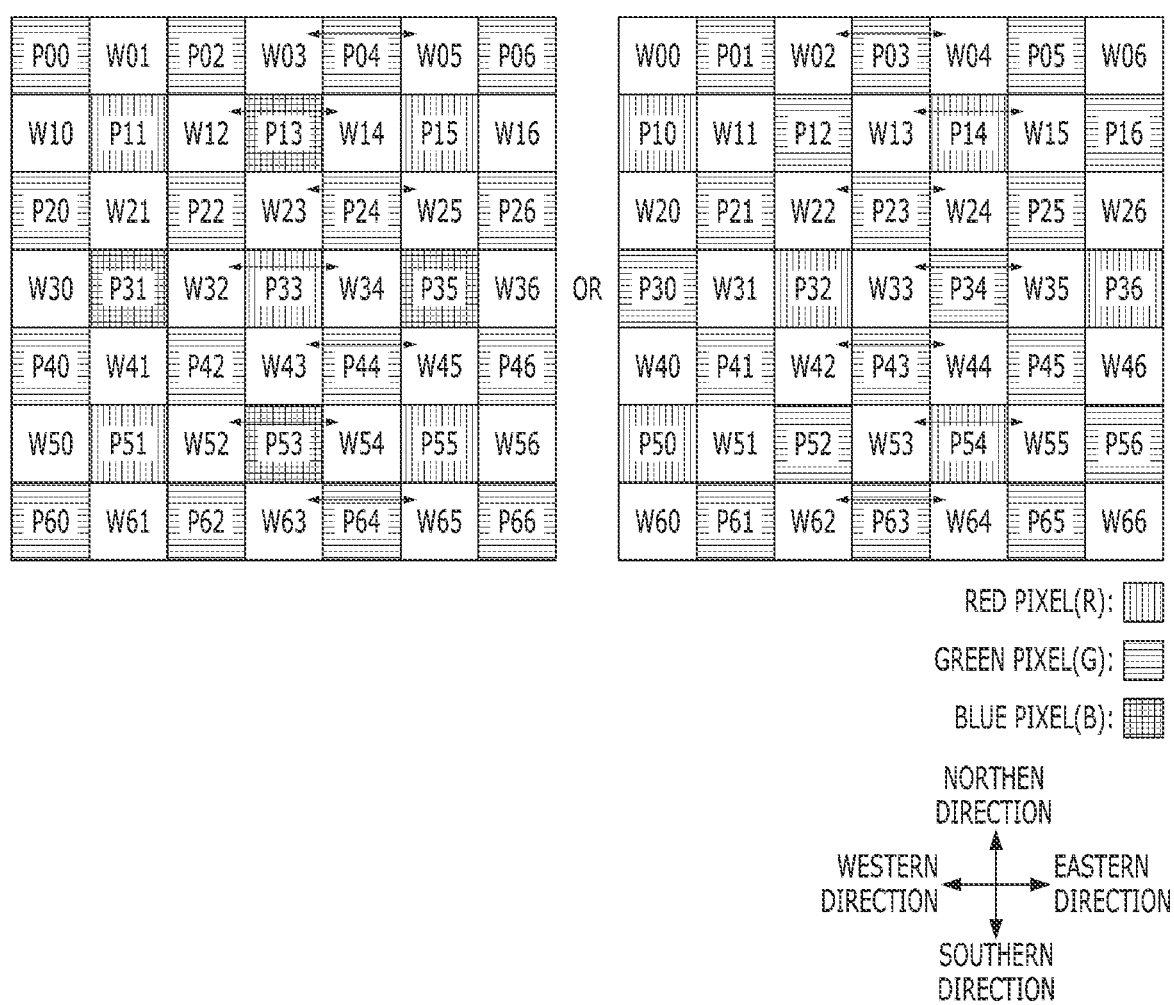
FIG. 3 is a diagram illustrating a calculation of white pixel value for each direction based on a pixel value difference between white pixels.
Figure 4:
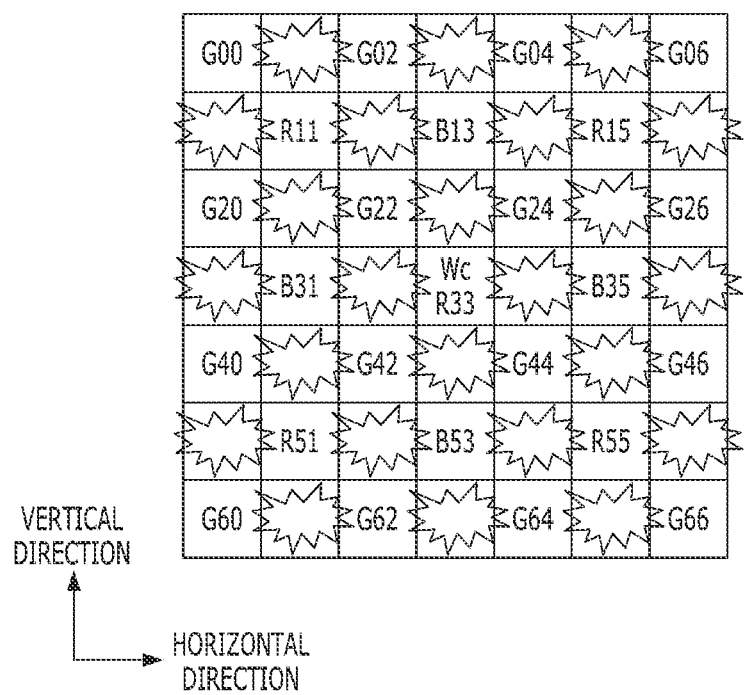
FIG. 4 is a diagram illustrating an estimated white pixel value of a red pixel disposed in a center.
Figure 5:
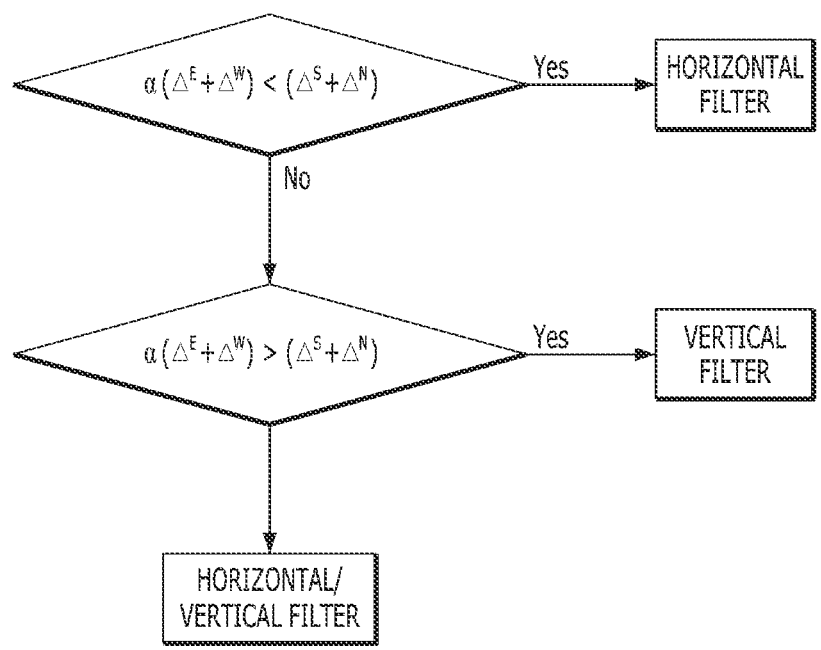
FIG. 5 is a diagram illustrating a fine adjustment of the white pixel value.
Figure 6:
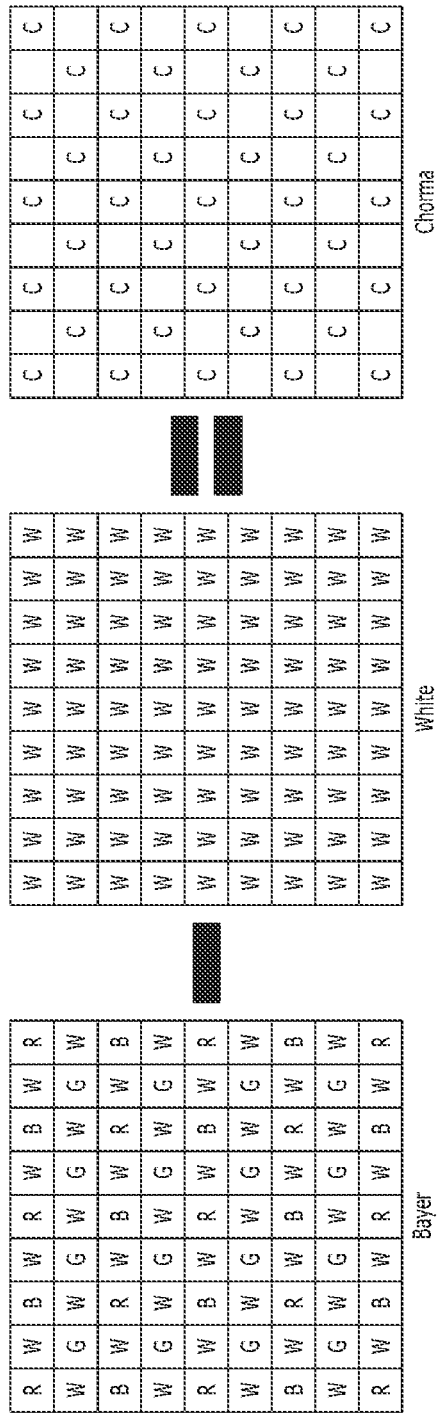
FIG. 6 is a diagram illustrating the estimation of a chroma array.
Figure 7:
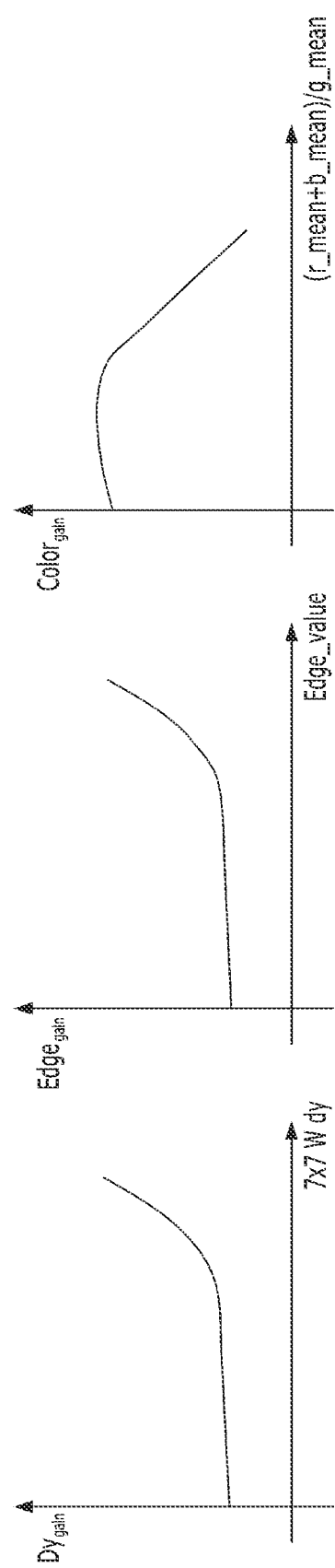
FIG. 7 are graphs illustrating a white pixel gain, an edge gain and a color gain.

FIG. 1 is a block diagram illustrating a demosaic operation circuit in accordance with an embodiment of the present disclosure. FIG. 2 is a diagram illustrating a calculation of white pixel value for each direction based on a pixel value difference between pixels having different colors. FIG. 3 is a diagram illustrating a calculation of white pixel value for each direction based on a pixel value difference between white pixels. FIG. 4 is a diagram illustrating an estimated white pixel value of a red pixel disposed in a center. FIG. 5 is a diagram illustrating a fine adjustment of the white pixel value. FIG. 6 is a diagram illustrating the estimation of a chroma array. FIG. 7 are graphs illustrating a white pixel gain, an edge gain and a color gain.

Referring to FIG. 1, a demosaic operation circuit 300 may include a white pixel value estimation circuit 310, a fine adjustment circuit 320, a chroma estimation circuit 330 and a color correction circuit 340.

The white pixel value estimation circuit 310 may acquire an RGB channel average value and a directional gradient value of a white pixel for each direction using source pixel data provided from a pixel array having a plurality of pixels, and estimate a white pixel value based on the RGB channel average value and the directional gradient value of the white pixel for each direction.

The white pixel value estimation circuit 310 may include a white pixel value calculation circuit 312, an RGB channel average value calculation circuit 314 and a white pixel value estimator 316.

The white pixel value calculation circuit 312 may calculate a directional gradient value of the white pixel for each direction based on an absolute value of a pixel value difference between the white pixels and a pixel value difference between pixels having different colors among the source pixel data provided from the pixel array.

Referring to FIG. 2, the directional gradient value of the white pixel for each direction may be calculated using the pixel value difference between the pixels having different colors as expressed in equation 1.

$$D^E_{p33} = \left|\frac{P33}{2} - \frac{P34}{2}\right| + \left|\frac{P34}{2} - \frac{P35}{2}\right| + \left|\frac{P23}{2} - \frac{P24}{2}\right| +$$
$$\left|\frac{P24}{2} - \frac{P25}{2}\right| + \left|\frac{P43}{2} - \frac{P44}{2}\right| + \left|\frac{P44}{2} - \frac{P45}{2}\right|$$

$$D^H_{p33} = \frac{D^E_{p33}}{2} + \frac{D^W_{p33}}{2}$$

$$W^{est}_{p33} = \begin{cases} \frac{P32+P34}{2}, & \text{where } D^H_{p33} < D^V_{p33} \\ \frac{P23+P43}{2}, & \text{where } D^V_{p33} < D^H_{p33} \end{cases}$$

$$\Delta^E = \left\{\left|\frac{W_{33}-W_{34}}{2}\right| + \left|\frac{W_{23}-W_{24}}{2}\right| + \left|\frac{W_{24}-W_{25}}{2}\right| + \left|\frac{W_{43}-W_{44}}{2}\right| + \left|\frac{W_{44}-W_{45}}{2}\right|\right\} / 4$$

[Equation 1]

where $D_{p33}^E$ represents a sum of the pixel value difference between pixels having different colors along an eastern direction from a center pixel P33, $D_{p33}^W$ represents a sum of the pixel value difference between pixels having different colors along a western direction from the center pixel P33, $D_{p33}^H$ represents a sum of the pixel value difference between pixels along a horizontal direction from the center pixel P33, $D_{p33}^V$ represents a sum of the pixel value difference between pixels along a vertical direction from the center pixel P33, $W_{p33}^{1st}$ represents a first estimated white pixel value, and $\Delta_E$ represents an gradient value of the white pixel in an eastern direction.

Also, a gradient value of the white pixel in a western direction, a gradient value of the white pixel in a southern direction and a gradient value of the white pixel in a northern direction may be calculated using the same equation as equation 1.

Referring to FIG. 3, the directional gradient value of the white pixel for each direction using a pixel value difference between the white pixels is expressed in equation 2.

$$\Delta^E = \begin{cases} \left\{\left|\frac{P_{32}-P_{34}}{2}\right| + \left|\frac{P_{43}-P_{45}}{2}\right| + \\ \left|\frac{P_{52}-P_{54}}{2}\right| + \left|\frac{P_{63}-P_{65}}{2}\right| + \\ \left|\frac{P_{23}-P_{25}}{2}\right| + \left|\frac{P_{12}-P_{14}}{2}\right| + \\ \left|\frac{P_{03}-P_{05}}{2}\right| \end{cases} / 8, \text{ where center: W location} \\ \left\{\left|\frac{P_{33}-P_{35}}{2}\right| + \left|\frac{P_{42}-P_{44}}{2}\right| + \\ \left|\frac{P_{53}-P_{55}}{2}\right| + \left|\frac{P_{62}-P_{64}}{2}\right| + \\ \left|\frac{P_{22}-P_{24}}{2}\right| + \left|\frac{P_{13}-P_{15}}{2}\right| + \\ \left|\frac{P_{02}-P_{04}}{2}\right| \end{cases} / 8, \text{ where center: R, G, B location} \end{cases}$$

[Equation 2]

where, $\Delta_E$ represents a gradient value of the white pixel in an eastern direction. Also, a gradient value of the white pixel in a western direction, a gradient value of the white pixel in a southern direction and a gradient value of the white pixel in a northern direction may be calculated using the same equation as equation 2.

The RGB channel average value calculation circuit 314 may calculate an RGB channel average value based on a location of a center pixel among the source pixel data provided from the pixel array.

The white pixel value estimator 316 may estimate the white pixel value based on the RGB channel average value and the directional gradient value of the white pixel for each direction.

The estimated white pixel value in the horizontal direction may be calculated as expressed in equation 3.

$$\tilde{W}_{P33} = \frac{W^W_{P34} \times \eta^W + W^E_{P32} \times \eta^E}{\eta^W + \eta^E}, \eta^E = \frac{1}{\Delta^E}, \eta^W = \frac{1}{\Delta^W}$$

[Equation 3]

where $\Delta_E$ represents a gradient value of the white pixel in an eastern direction, $\Delta_W$ represents a gradient value of the white pixel in a western direction, $W_{P34}^W$ represents the white pixel value along a western direction from a pixel P34, $W_{P32}^E$ represents the white pixel value along an eastern direction from a pixel P32, and $\tilde{W}_{P33}$ represents the estimated white pixel value in a horizontal direction from the center pixel P33.

The estimated white pixel value in the vertical direction may be calculated as expressed in equation 4.

$$\tilde{W}_{P33} = \frac{W^S_{P43} \times \eta^S + W^N_{P23} \times \eta^N}{\eta^S + \eta^N}, \eta^N = \frac{1}{\Delta^N}, \eta^S = \frac{1}{\Delta^S}$$

[Equation 4]

where $\Delta^N$ represents a gradient value of the white pixel in a northern direction, $\Delta^S$ represents a gradient value of the white pixel in a southern direction, $\tilde{W}_{P43}^S$ represents the white pixel value along a southern direction from a pixel P43, $W_{P23}^N$ represents the white pixel value along a northern direction from a pixel P23, and $\tilde{W}_{P33}$ represents the estimated white pixel value in a vertical direction from the center pixel P33.

Also, the estimated white pixel value in the horizontal/vertical direction may be calculated as expressed in equation 5.

$$\tilde{W}_{P33} = \frac{W^E_{P34} \times \eta^E + W^W_{P32} \times \eta^W + W^S_{P43} \times \eta^S + W^N_{P23} \times \eta^N}{\eta^E + \eta^W + \eta^S + \eta^N},$$

$$\eta^E = \frac{1}{\Delta^E}, \eta^W = \frac{1}{\Delta^W}, \eta^N = \frac{1}{\Delta^N}, \eta^S = \frac{1}{\Delta^S}$$

[Equation 5]

where $W_{P34}^W$ represents the white pixel value along a western direction from a pixel P34, $W_{P32}^E$ represents the white pixel value along an eastern direction from a pixel P32, $W_{P43}^S$ represents the white pixel value along a southern direction from a pixel P43, $W_{P23}^N$ represents the white pixel value along a northern direction from a pixel P23, $\Delta_E$ represents a gradient value of the white pixel in an eastern direction, $\Delta^W$ represents a gradient value of the white pixel in a western direction, $\Delta^N$ represents a gradient value of the white pixel in a northern direction, $\Delta^S$ represents a gradient value of the white pixel in a southern direction, and $\tilde{W}_{P33}$ represents the estimated white pixel value in a horizontal/vertical direction from the center pixel P33.

The fine adjustment circuit 320 may finely adjust an estimated white pixel value by removing a noise from the estimated white pixel value through a different filter based on weight values which are differently allocated according to a gradient of a center pixel and a neighboring white pixel.

For example, referring to FIG. 4, the estimated white pixel value Wc of the red pixel R33 located in a center of a 7×7 pixel array may be finely adjusted.

Also, when the center pixel P33 is a blue pixel or a green pixel, the estimated white pixel value may be finely adjusted by removing the noise using the estimated white pixel value through a horizontal filter, a vertical filter or a horizontal/vertical filter.

Referring to FIG. 5, if a value obtained by multiplying a predetermined weight ($\alpha$) and the sum of the gradient value of the white pixel in the eastern direction and the gradient value of the white pixel in the western direction is less than the sum of the gradient value of the white pixel in the southern direction and the gradient value of the white pixel in the northern direction, the estimated white pixel value may be finely adjusted by removing the noise through the horizontal filter.

Also, if the value obtained by multiplying a predetermined weight ($\alpha$) and the sum of the gradient value of the white pixel in the eastern direction and the gradient value of the white pixel in the western direction is greater than the sum of the gradient value of the white pixel in the southern direction and the gradient value of the white pixel in the northern direction, the estimated white pixel value may be finely adjusted by removing the noise through the vertical filter.

Also, if the value obtained by multiplying a predetermined weight ($\alpha$) and the sum of the gradient value of the white pixel in the eastern direction and the gradient value of the white pixel in the western direction is same as the sum of the gradient value of the white pixel in the southern direction and the gradient value of the white pixel in the northern direction, the estimated white pixel value may be finely adjusted by removing the noise through the horizontal/vertical filter.

The chroma estimation circuit 330 may estimate a chroma for each channel by calculating a chroma array based on the source pixel data and an adjusted white pixel value.

More specifically, referring to FIG. 6, the chroma estimation circuit 330 may calculate the chroma array by subtracting the adjusted white pixel value from the source pixel data of a Bayer pattern. The chroma estimation circuit 330 may allocate the chroma weight according to a chroma similarity for each channel to a chroma value of the center pixel among the chroma array, and estimate the chroma for each channel based on the allocated chroma weight.

The chroma for each channel may be estimated as expressed in equation 6.

$$R_c^{chroma} = \sum_{(i,j) \in kernel, R\ location} R^{chroma}(i,j) \times R_{wgt}^{chroma}(i,j)$$

$$G_c^{chroma} = \sum_{(i,j) \in kernel, G\ location} G^{chroma}(i,j) \times G_{wgt}^{chroma}(i,j)$$

$$B_c^{chroma} = \sum_{(i,j) \in kernel, B\ location} B^{chroma}(i,j) \times B_{wgt}^{chroma}(i,j)$$

[Equation 6]

where $R_c^{chroma}$ represents an estimated chroma of the red pixel located in the center pixel, $G_c^{chroma}$ represents an estimated chroma of the green pixel located in the center pixel, $B_c^{chroma}$ represents an estimated chroma of the blue pixel located in the center pixel, wgt represents a weight value, (i,j) represents a location of the red pixel, the green pixel and the blue pixel.

The color correction circuit 340 may correct the color based on a finely adjusted white pixel value of the fine adjustment circuit 320 and the estimated chroma of the red pixel, the green pixel and the blue pixel of the chroma estimation circuit 330.

Referring to FIG. 7, the color correction may be optimized using the white pixel gain $DY_{gain}$, the edge gain $Edge_{gain}$ and the color gain $Color_{gain}$. That is, the color correction may be calculated as expressed in equation 7.

$$fcs_{gain} = DY_{gain} \times Edge_{gain} \times Color_{gain}$$

$$R_{est} = G_{out} + fcs_{gain} \times (R_{out} - G_{out})$$

$$B_{est} = B_{out} + fcs_{gain} \times (B_{out} - G_{out})$$

$$R_{out} = W_c^{est} + R_c^{chroma}$$

$$G_{out} = W_c^{est} + G_c^{chroma}$$

$$B_{out} = W_c^{est} + B_c^{chroma}$$

[Equation 7]

where $fcs_{gain}$ represents an error color correction gain, $DY_{gain}$ represents a white pixel gain, $Color_{gain}$ represents a color gain, $R_{out}$ represents the sum of the estimated chroma value and the finely adjusted white pixel value of the red pixel located in the center, $G_{out}$ represents the sum of the estimated chroma value and the finely adjusted white pixel value of the green pixel located in the center, $B_{out}$ represents the sum of the estimated chroma value and the finely adjusted white pixel value of the blue pixel located in the center, $R_{est}$ represents a corrected color of the red pixel, $G_{est}$ represents a corrected color of the green pixel, and $B_{est}$ represents a corrected color of the blue pixel.

Figure 8:
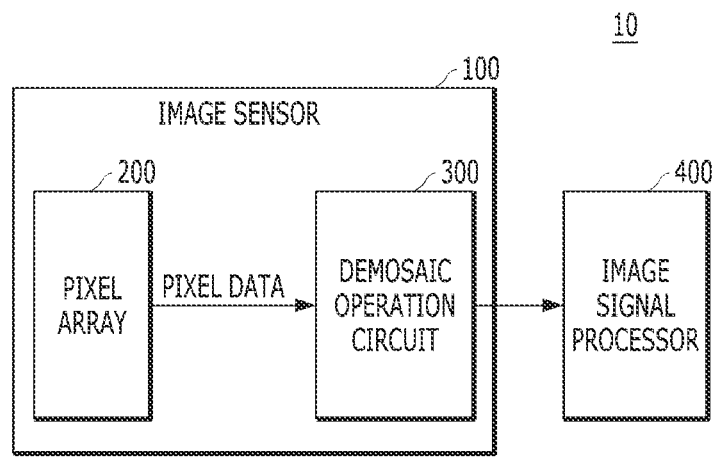
FIG. 8 is a block diagram illustrating an image sensing device employing a demosaic operation circuit in accordance with another embodiment of the present disclosure.

FIG. 8 is a block diagram illustrating an image sensing device 10 in accordance with an embodiment of the present disclosure.

Referring to FIG. 8, the image sensing device 10 may include an image sensor 100 and an image signal processor (ISP) 400.

The image sensing device 10 may be implemented in any suitable electronic device, such as a personal computer (PC) or a mobile computing device that can receive and process image data.

More specifically, the image sensing device 10 may be implemented in a laptop computer, a mobile phone, a smart phone, a tablet, a personal digital assistant (PDA), an enterprise digital assistant (EDA), a digital still camera, a digital video camera, a portable multimedia player (PMP), a mobile internet device (MID), a wearable computer, as an object in an Internet of things (IoT) network, or as an object in an internet of everything (IoE) network.

The image sensor 100 may include a pixel array 200 and a demosaic operation circuit 300.

The pixel array 200 may include a plurality of pixels. Herein, each pixel may represent pixel data, and have an RGB data format, YUV data format, YCbCr data format, or any other data format consistent with the teachings herein.

The demosaic operation circuit 300 may perform a demosaic operation of RGBW pattern having a white pixel of 50%.

The demosaic operation circuit 300 may be implemented as shown in FIGS. 1 to 7.

The detailed configuration and operations of the demosaic operation circuit 300 are described in detail with reference to FIGS. 1 to 7.

The image signal processor 400 may be implemented in an integrated circuit, a system on chip (SoC) or a mobile application processor. The image signal processor 400 may process an output signal of the image sensor 100. That is, the image signal processor 400 may receive and process an image output signal outputted from the demosaic operation circuit 300 of the image sensor 100.

More specifically, the image signal processor 400 may generate RGB image data from a Bayer pattern corresponding to pixel data. For example, the image signal processor 400 may process a Bayer pattern such that the image data is displayed in a display, and may transfer processed image data to an interface for transfer to another component or device.

In an embodiment, each of the image sensor 100 and the image signal processor 400 may be implemented as a multi-chip package (MCP). In another embodiment, the image sensor 100 and the image signal processor 400 may be implemented as a single chip.

Figure 9:
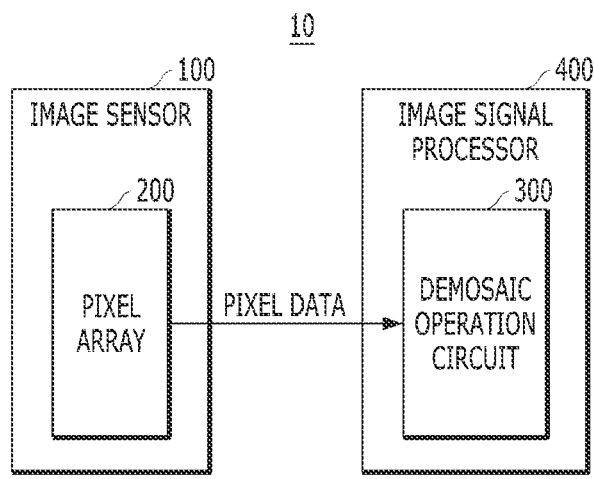
FIG. 9 is a block diagram illustrating an image sensing device employing a demosaic operation circuit in accordance with another embodiment of the present disclosure.

FIG. 9 is a block diagram illustrating an image sensing device 10 in accordance with an embodiment of the present disclosure.

Referring to FIG. 9, the image sensing device 10 may include an image sensor 100 and an image signal processor (ISP) 400. The image signal processor 400 may include a demosaic operation circuit 300.

The demosaic operation circuit 300 may be implemented as shown in FIGS. 1 to 7.

The structure and operation of the image sensing device 10 shown in FIG. 9 are substantially the same as the structure and operation of the image sensing device 10 shown in FIG. 8, except that the demosaic operation circuit 300 is implemented in the image signal processor 400 instead of in the image sensor 100. Thus, a detailed description of the image sensing device 10 of FIG. 9 is omitted.

Figure 10:
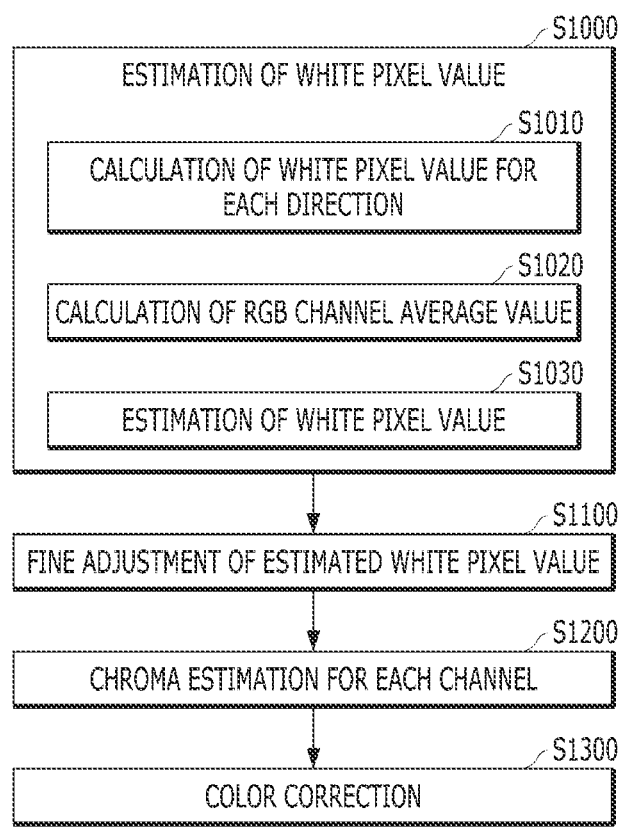
FIG. 10 is a flow chart illustrating an operation of an image sensing device in accordance with another embodiment of the present disclosure.

Hereinafter, an operation of an image sensing device in accordance with an embodiment of the present disclosure is described with reference to FIG. 10. FIG. 10 is a flow chart illustrating an operation of an image sensing device (e.g., image sensing device 10 in FIGS. 8 and 9) in accordance with an embodiment of the present disclosure.

Referring to FIG. 10, the operation of an image sensing device may include an estimation of a white pixel value S1000, a fine adjustment of estimated white pixel value S1100, a chroma estimation for each channel S1200 and a color correction S1300.

At operation S1000, an RGB channel average value and a directional gradient value of a white pixel for each direction may be acquired using source pixel data provided from a pixel array having a plurality of pixels. The white pixel value may be estimated based on the RGB channel average value and the directional gradient value of the white pixel for each direction.

More specifically, the estimation of the white pixel value S1000 may include a calculation operation of the gradient value of the white pixel for each direction S1010, a calculation operation of an RGB channel average value S1020 and an estimation operation of the white pixel value S1030.

At operation S1010, the directional gradient of the white pixel for each direction may be calculated based on an absolute value of a pixel value difference between the white pixels and a pixel value difference between pixels having different colors among the source pixel data provided from the pixel array.

At operation S1020, the calculation of the RGB channel average value may be calculated according to a location of a center pixel among the source pixel data provided from the pixel array.

At operation S1030, the white pixel value may be estimated based on the RGB channel average value and the directional gradient value of the white pixel for each direction.

Herein, when the center pixel is a green pixel, a red pixel or a blue pixel, the white pixel value corresponding to the center pixel may be estimated using the horizontal direction filter and the vertical direction filter.

At operation S1100, the estimated white pixel value may be finely adjusted by removing a noise from the estimated white pixel value through a different filter based on weight values which are differently allocated according to a gradient of a center pixel and a neighboring white pixel.

At operation S1200, the chroma for each channel may be estimated by calculating a chroma array based on the source pixel data and the finely adjusted white pixel value.

Herein, the chroma array may be calculated by subtracting a finely adjusted white pixel value from the source pixel data.

Also, the chroma weight may be allocated according to a chroma similarity for each channel to the chroma value of the center pixel among the chroma array, and the chroma for each channel may be estimated according to the allocated chroma weight.

Hereinafter, a system configured to implement an image sensing device in accordance with an embodiment of the present disclosure is described in detail with reference to FIG. 11.

Figure 11:
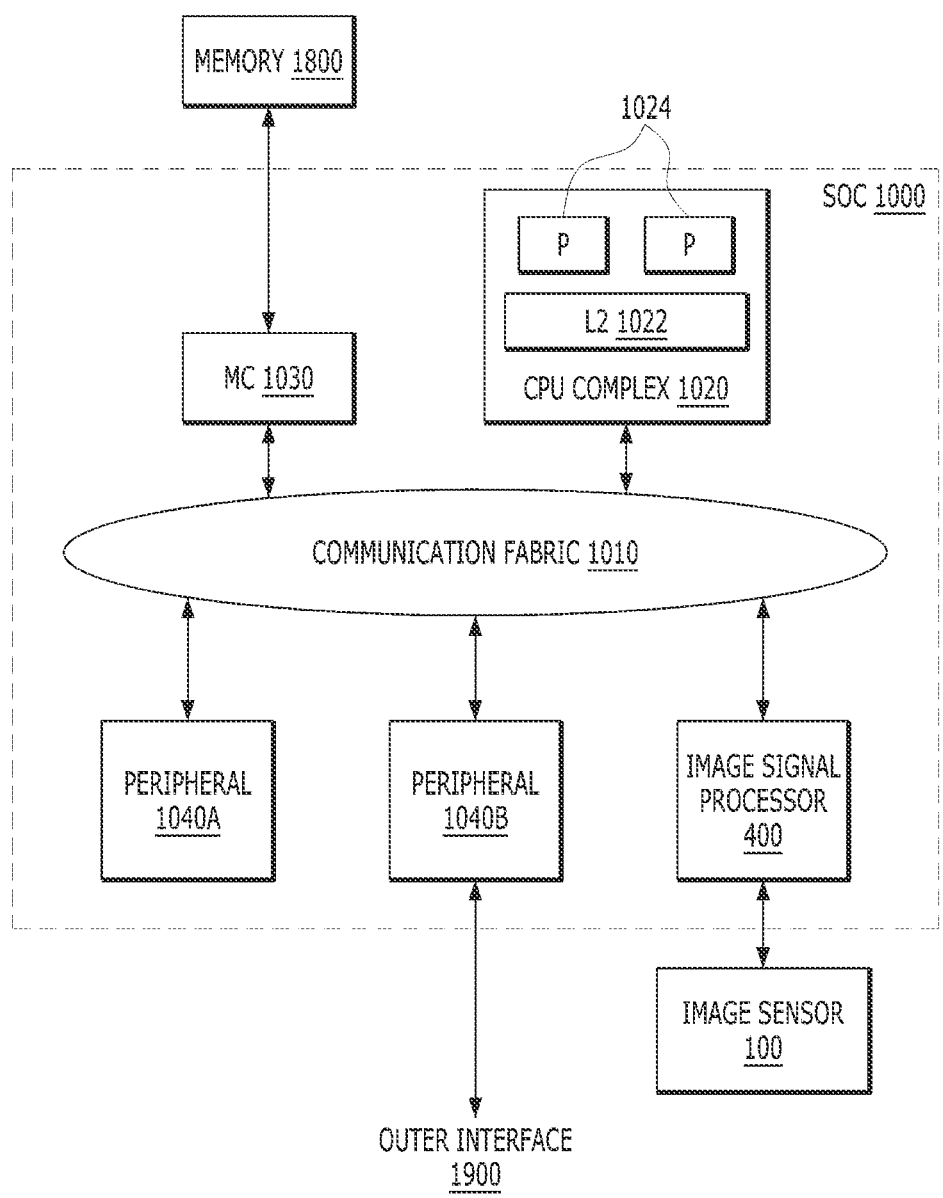
FIG. 11 is a block diagram illustrating a system configured to implement an image sensing device in accordance with another embodiment of the present disclosure.

FIG. 11 illustrates a system configured to implement an image sensing device in accordance with an embodiment of the present disclosure.

In various embodiments, the system of FIG. 11 may be any of various types of computing devices, including, but not limited to, a personal computer system, desktop computer, laptop or notebook computer, mainframe computer system, handheld computing device, cellular phone, smartphone, mobile phone, workstation, network computer, a consumer device, application server, storage device, intelligent display, a peripheral device such as a switch, modem, router, etc., or in general any type of computing device. According to an embodiment, the system of FIG. 11 may represent a system-on-a-chip (SoC). The circuits of the SoC 1000 may be integrated onto a single semiconductor substrate as an integrated circuit, i.e., a "chip." In some embodiments, the circuits may be implemented on two or more discrete chips in a system. The SoC 1000 will be used as an example herein.

In the illustrated embodiment, the circuits of the SoC 1000 include a central processing unit (CPU) complex 1020, on-chip peripheral circuits 1040A-1040B (individually, "peripheral" and collectively "peripherals"), a memory controller (MC) 1030, a communication fabric 1010, and an image signal processor 400. The SoC 1000 may also be coupled to additional circuits, such as to a memory 1800 and an image sensor 100. The circuits 1020, 1030, 1040A-1040B, and 400 may all be coupled to the communication fabric 1010. The memory controller 1030 may be coupled to the memory 1800, and the peripheral 1040B may be coupled to an outer interface 1900. Additionally, the image signal processor 400 may be coupled to the image sensor 100.

The peripherals 1040A-1040B may be any set of additional hardware functionality in the SoC 1000. For example, the peripherals 1040A-1040B may include display controllers configured to display video data on one or more display devices, graphics processing units (GPUs), video encoder/decoders, scalers, rotators, blenders, etc.

The image signal processor 400 may, in some embodiments, be part of another video peripheral configured to process image capture data from the image sensor 100 (or other image sensor). The image signal processor 400 and the image sensor 100 may be configured to implement the image signal processor 400 and the image sensor 100 shown in FIGS. 1 to 10.

The peripherals 1040A-1040B may also include audio peripherals such as microphones, speakers, interfaces to microphones and speakers, audio processors, digital signal processors, mixers, etc. The peripherals 1040A-1040B (e.g., the peripheral 1040B) may include peripheral interface controllers for various interfaces 1900 external to the SoC 1000 including interfaces such as Universal Serial Bus (USB), peripheral circuit interconnect (PCI) including PCI Express (PCIe), serial and parallel ports, etc. The peripherals 1040A-1040B may further include networking peripherals such as media access controllers (MACs). In general, any set of hardware may be included, according to various embodiments.

The CPU complex 1020 may include one or more processors (Ps) 1024 that serve as the CPU of the SoC 1000. The processor(s) 1024 may execute the main control software of the system, such as an operating system. Generally, software executed by the CPU may control the other circuits of the system to realize the desired functionality of the system. The processors 1024 may also execute other software, such as application programs. The application programs may provide user functionality and may rely on the operating system for lower level device control. Accordingly, the processors 1024 may also be referred to as application processors. The CPU complex 1020 may further include other hardware such as the L2 cache 1022 and/or an interface to the other circuits of the system (e.g., an interface to the communication fabric 1010).

Generally, a processor may include any circuitry and/or microcode configured to execute instructions defined in an instruction set architecture implemented by the processor. The instructions and data operated on by the processors in response to executing the instructions may generally be stored in the memory 1800, although certain instructions may be defined for direct processor access to peripherals as well. Processors may encompass processor cores implemented on an integrated circuit with other circuits as a system on a chip (SoC 1000) or other levels of integration. Processors may further encompass discrete microprocessors, processor cores and/or microprocessors integrated into multichip module implementations, processors implemented as multiple integrated circuits, etc.

The memory controller 1030 may generally include circuitry for receiving memory operations from other circuits of the SoC 1000 and for accessing the memory 1800 to complete the memory operations. The memory controller 1030 may be configured to access any type of memory 1800. For example, the memory 1800 may be a static random access memory (SRAM), or a dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 1030 may include queues for memory operations, for ordering (and potentially reordering) the operations and presenting the operations to the memory 1800. The memory controller 1030 may further include data buffers to store write data awaiting write to memory and read data awaiting return to the source of the memory operation. In some embodiments, the memory controller 1030 may include a memory cache to store recently accessed memory data. In SoC implementations, for example, the memory cache may reduce power consumption in the SoC by avoiding re-access of data from the memory 1800 if it is expected to be accessed again soon. In some cases, the memory cache may also be referred to as a system cache, as opposed to private caches such as the L2 cache 1022 or caches in the processors 1024, which serve only certain circuits. Additionally, in some embodiments, a system cache may be located externally to the memory controller 1030.

In an embodiment, the memory 1800 may be packaged with the SoC 1000 in a chip-on-chip or package-on-package configuration. A multichip module configuration of the SoC 1000 and the memory 1800 may be used as well. Such configurations may be relatively more secure (in terms of data observability) than transmissions to other circuits in the system (e.g. to the end points). Accordingly, protected data may reside in the memory 1800 unencrypted, whereas the protected data may be encrypted for exchange between the SoC 1000 and external endpoints.

The communication fabric 1010 may be any communication interconnect and protocol for communicating among the circuits of the SoC 1000. The communication fabric 1010 may be bus-based, including shared bus configurations, cross bar configurations, and hierarchical buses with bridges. The communication fabric 1010 may also be packet-based, and may be hierarchical with bridges, cross bar, point-to-point, or other interconnects.

It is noted that the number of circuits of the SoC 1000 (and the number of subcircuits within the CPU complex 1020) may vary in different embodiments. There may be more or fewer of each circuit/subcircuit than the number shown in FIG. 11.

In some embodiments, the methods described herein may be implemented by a computer program product, or software. In some embodiments, a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other forms of propagated signal (e.g., carrier waves, infrared signals, digital signals, etc.).

As described above, a demosaic operation circuit, an image sensing device and an operation method of the same in accordance with embodiments of the present disclosure may perform a demosaic operation for an image pattern having white pixel data of 50% among source pixel data having RGBW pattern.

While the present disclosure illustrates and describes specific embodiments, it will be apparent to those skilled in the art in light of the present disclosure that various changes and modifications may be made without departing from the spirit and scope of the invention as defined in the following claims. The present invention encompasses all such changes and modifications to the extent the changes and modifications fall within the scope of the claims.

What is claimed is:

1. A demosaic operation circuit, comprising:
   a white pixel value estimation circuit suitable for acquiring an RGB channel average value and a directional gradient value of a white pixel for each direction using source pixel data provided from a pixel array having a plurality of pixels, and estimating a white pixel value based on the RGB channel average value and the directional gradient value of the white pixel for each direction;
   a fine adjustment circuit suitable for finely adjusting an estimated white pixel value by removing a noise through a different filter based on weight values which are differently allocated according to a gradient of a center pixel and a neighboring white pixel;
   a chroma estimation circuit suitable for estimating a chroma for each channel by calculating a chroma array based on the source pixel data and a finely adjusted white pixel value; and
   a color correction circuit suitable for correcting a color based on the finely adjusted white pixel value and the chroma for each channel.

2. The demosaic operation circuit of claim 1, wherein the white pixel value estimation circuit includes:
   a white pixel value calculation circuit suitable for calculating the directional gradient value of the white pixel based on an absolute value of a pixel value difference between the white pixels and a pixel value difference between pixels having different colors among the source pixel data provided from the pixel array;
   an RGB channel average value calculation circuit suitable for calculating an RGB channel average value based on a location of a center pixel among the source pixel data provided from the pixel array; and
   a white pixel value estimator suitable for estimating the white pixel value based on the RGB channel average value and the directional gradient value of the white pixel for each direction.

3. The demosaic operation circuit of claim 2, wherein the white pixel value estimator estimates the white pixel value corresponding to the center pixel using a horizontal direction filter and a vertical direction filter when the center pixel is a green pixel, a red pixel or a blue pixel.

4. The demosaic operation circuit of claim 3, wherein the fine adjustment circuit finely adjusts the white pixel value based on a gradient value of the estimated white pixel value when the center pixel is the green pixel, the red pixel or the blue pixel.

5. The demosaic operation circuit of claim 1, wherein the chroma estimation circuit calculates the chroma array by subtracting the finely adjusted white pixel value from the source pixel data.

6. The demosaic operation circuit of claim 5, wherein the chroma estimation circuit allocates chroma weight according to a chroma similarity for each channel to a chroma value of the center pixel among the chroma array, and estimates the chroma for each channel based on an allocated chroma weight.

7. The demosaic operation circuit of claim 6, wherein the chroma estimation circuit estimates the chroma for each channel according to the following equation:

$$R_c^{chroma} = \sum_{(i,j)\in kernel, R\ location} R^{chroma}(i,j) \times R_{wgt}^{chroma}(i,j)$$

$$G_c^{chroma} = \sum_{(i,j)\in kernel, G\ location} G^{chroma}(i,j) \times G_{wgt}^{chroma}(i,j)$$

$$B_c^{chroma} = \sum_{(i,j)\in kernel, B\ location} B^{chroma}(i,j) \times B_{wgt}^{chroma}(i,j)$$

where $R_c^{chroma}$ represents an estimated chroma of the red pixel located in the center, $G_c^{chroma}$ represents an estimated chroma of the green pixel located in the center, $B_c^{chroma}$ represents an estimated chroma of the blue pixel located in the center, wgt represents a weight, (i,j) represents a location of the red pixel, the green pixel and the blue pixel.

8. The demosaic operation circuit of claim 7, wherein the color correction circuit corrects the color according to the following equation:

$$fcs_{gain} = DY_{gain} \times Edge_{gain} \times Color_{gain}$$

$$R_{est} = G_{out} + fcs_{gain} \times (R_{out} - G_{out})$$

$$B_{est} = B_{out} + fcs_{gain} \times (B_{out} - G_{out})$$

$$R_{out} = W_c^{est} + R_c^{chroma}$$

$$G_{out} = W_c^{est} + G_c^{chroma}$$

$$B_{out} = W_c^{est} + B_c^{chroma}$$

where $fcs_{gain}$ represents an error color correction gain, $DY_{gain}$ represents a white pixel gain, $Edge_{gain}$ represents an edge gain, $Color_{gain}$ represents a color gain, $R_{out}$ represents a sum of the estimated chroma value and the finely adjusted white pixel value of the red pixel located in the center pixel, $G_{out}$ represents a sum of the estimated chroma value and the finely adjusted white pixel value of the green pixel located in the center pixel, $B_{out}$ represents a sum of the estimated chroma value and the finely adjusted white pixel value of the blue pixel located in the center pixel, $R_{est}$ represents a corrected color of the red pixel, $G_{est}$ represents a corrected color of the green pixel, and $B_{est}$ represents a corrected color of the blue pixel.

9. An image sensing device, comprising:
   an image sensor including a pixel array having a plurality of pixels;
   an image signal processor suitable for processing an output signal of the image sensor; and
   a mosaic operation circuit,
   wherein the mosaic operation circuit comprises
      a white pixel value estimation circuit suitable for acquiring an RGB channel average value and a directional gradient value of a white pixel for each direction using source pixel data provided from a pixel array having a plurality of pixels, and estimating a white pixel value based on the RGB channel average value and the directional gradient value of the white pixel for each direction;
      a fine adjustment circuit suitable for finely adjusting an estimated white pixel value by removing a noise through a different filter based on weight values which are differently allocated according to a gradient of a center pixel and a neighboring white pixel;

a chroma estimation circuit suitable for estimating a chroma for each channel by calculating a chroma array based on the source pixel data and a finely adjusted white pixel value; and a color correction circuit suitable for correcting a color based on the finely adjusted white pixel value and the chroma for each channel.

10. The image sensing device of claim 9, wherein the white pixel value estimation circuit includes:

a white pixel value calculation circuit suitable for calculating the directional gradient value of the white pixel based on an absolute value of a pixel value difference between the white pixels and a pixel value difference between pixels having different colors among the source pixel data provided from the pixel array;

an RGB channel average value calculation circuit suitable for calculating an RGB channel average value based on a location of a center pixel among the source pixel data provided from the pixel array; and a white pixel value estimator suitable for estimating the white pixel value based on the RGB channel average value and the directional gradient value of the white pixel for each direction.

11. The image sensing device of claim 10, wherein the white pixel value estimator estimates the white pixel value corresponding to the center pixel using a horizontal direction filter and a vertical direction filter when the center pixel is a green pixel, a red pixel or a blue pixel.

12. The image sensing device of claim 11, wherein the fine adjustment circuit finely adjusts the white pixel value based on a gradient value of the estimated white pixel value when the center pixel is the green pixel, the red pixel or the blue pixel.

13. The image sensing device of claim 9, wherein the chroma estimation circuit calculates the chroma array by subtracting the finely adjusted white pixel value from the source pixel data.

14. The image sensing device of claim 13, wherein the chroma estimation circuit allocates chroma weight according to a chroma similarity for each channel to a chroma value of the center pixel among the chroma array, and estimates the chroma for each channel based on an allocated chroma weight.

15. An operation method of an image sensing device, comprising:

acquiring an RGB channel average value and a directional gradient value of a white pixel for each direction using source pixel data provided from a pixel array having a plurality of pixels, and estimating a white pixel value based on the RGB channel average value and the directional gradient value of the white pixel for each direction;

finely adjusting an estimated white pixel value by removing a noise through a different filter based on weight values which are differently allocated according to a gradient of a center pixel and a neighboring white pixel;

estimating a chroma for each channel by calculating a chroma array based on the source pixel data and a finely adjusted white pixel value; and correcting a color based on the finely adjusted white pixel value and the chroma for each channel.

16. The operation method of claim 15, wherein the estimating of the white pixel value includes:

calculating the directional gradient value of the white pixel based on an absolute value of a pixel value difference between the white pixels and a pixel value difference between pixels having different colors among the source pixel data provided from the pixel array;

calculating an RGB channel average value based on a location of a center pixel among the source pixel data provided from the pixel array; and estimating the white pixel value based on the RGB channel average value and the directional gradient value of the white pixel for each direction.

17. The operation method of claim 16, wherein the estimating of the white pixel value estimates the white pixel value corresponding to the center pixel using a horizontal direction filter and a vertical direction filter when the center pixel is a green pixel, a red pixel or a blue pixel.

18. The operation method of claim 17, wherein the finely adjusting of an estimated white pixel value adjusts finely the white pixel value based on a gradient value of the estimated white pixel value when the center pixel is the green pixel, the red pixel or the blue pixel.

19. The operation method of claim 18, wherein the estimating of a chroma for each channel calculates the chroma array by subtracting the finely adjusted white pixel value from the source pixel data.

20. The operation method of claim 19, wherein the estimating of a chroma for each channel allocates chroma weight according to a chroma similarity for each channel to a chroma value of the center pixel among the chroma array, and estimates the chroma for each channel based on an allocated chroma weight.

* * * * *